US006342768B1

(12) United States Patent
van der Heiden

(10) Patent No.: US 6,342,768 B1
(45) Date of Patent: Jan. 29, 2002

(54) DISPLACEMENT APPARATUS ARRANGED FOR GUIDING A CARRYING DEVICE ALONG AT LEAST TWO RAILS

(75) Inventor: Arnoldus Theodorus van der Heiden, Bergschenhoek (NL)

(73) Assignee: Thyssen de Reus B.V., Krimpen aan den Ijssel (NL)

( * ) Notice: Subject to any disclaimer, the term of this patent is extended or adjusted under 35 U.S.C. 154(b) by 0 days.

(21) Appl. No.: 09/471,619

(22) Filed: Dec. 21, 1999

(30) Foreign Application Priority Data

Dec. 23, 1998 (NL) ............................................ 1010883

(51) Int. Cl.[7] ............................ H02P 7/00; B66B 23/02

(52) U.S. Cl. ............................ 318/39; 318/98; 318/99; 198/330; 198/321

(58) Field of Search ............................ 318/434, 34–89, 318/98, 99; 198/330, 331, 332, 810.01, 321, 333, 465.1, 465.2, 335, 323

(56) References Cited

U.S. PATENT DOCUMENTS 3,572,498 A * 3/1971 Hammitt
3,707,220 A * 12/1972 Boltrek et al.
3,743,077 A * 7/1973 Hammitt
3,876,061 A * 4/1975 Hammitt
4,056,759 A * 11/1977 Mitsui et al.
4,397,096 A * 8/1983 Kraft et al.
4,706,570 A 11/1987 Moro et al.
4,775,044 A * 10/1988 Hofling
4,863,006 A * 9/1989 Kotkata et al.
5,372,540 A * 12/1994 Burch et al.
5,566,810 A * 10/1996 Meyer et al.
5,622,246 A * 4/1997 Kubota
6,155,401 A * 12/2000 Lunardi et al.

FOREIGN PATENT DOCUMENTS

EP 0 394 201 A2 10/1980
GB 1 206 682 9/1970
WO 92/14673 9/1992

* cited by examiner

*Primary Examiner*—Paul Ip
(74) *Attorney, Agent, or Firm*—Merchant & Gould P.C.

(57) ABSTRACT

A displacement apparatus comprising a first rail and a second rail, extending substantially parallel thereto, while on the first rail a first driving gear with a first motor is provided and on the second rail a second driving gear with a second motor is provided, the first and the second rail comprising at least one inclined portion, and control means being provided for the two motors, which control means are arranged for controlling the first and the second motor in a force-controlled manner at least on a portion of the at least one inclined part of the first and the second rail.

17 Claims, 5 Drawing Sheets

DISPLACEMENT APPARATUS ARRANGED FOR GUIDING A CARRYING DEVICE ALONG AT LEAST TWO RAILS

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO A "MICROFICHE APPENDIX"

NOT APPLICABLE

BACKGROUND OF THE INVENTION

This invention relates to a displacement apparatus arranged for guiding a carrying device along at least two rails. Such a displacement apparatus is known from European patent application 0,394,201.

This known displacement apparatus comprises a first and a second rail, arranged above each other in one plane, while on each rail a running gear is arranged which carry a carrying device. Each running gear comprises a toothed wheel engaging a tooth track on the rail in question. This displacement apparatus comprises a motor providing for the drive of the carrying device, with the position of the carrying device, at least in inclined portions of the rails, being determined by the toothed wheels and the motor. The upper rail, at least in horizontal portions, is provided with a stability rail which is guided between two pairs of stability wheels, which stability wheels are fixedly connected with the carrying device. It is thus provided that upon a load off the center of the carrying device, as seen in front view, the carrying device is yet held in the desired vertical position.

This known displacement apparatus involves the disadvantage that it is particularly costly in manufacture and use, while moreover there is a substantial risk of malfunctions, in particular in that the displacement apparatus, in the horizontal portions of the rails is statically overdetermined.

The cause of this is that in order to obtain the desired stability, the guide rail and the guide wheels must be positioned particularly accurately to obtain a proper cooperation. In itself this is already costly and time-consuming, but even if a high degree of accuracy is given, the risk exists that unacceptably great forces on the guide wheels and the guide rail arise, partly as a consequence of relative displacements of the displacement apparatus relative to the rails, other than in the intended direction of displacement. Moreover, the mechanical loading of guide rail and guide wheels, in particular upon initial engagement, is often too high. As a result, often breakage in the guide wheels and/or the guide rail will occur, or the carrying device will jam, while moreover a high degree of wear will arise. A further disadvantage associated therewith is that the manufacture, installation and maintenance of such a known displacement apparatus are to be carried out particularly accurately, which is costly and leads to a high susceptibility to failure.

Further, international patent publication WO 92/14673 discloses a displacement apparatus of the type described in the opening paragraph hereof, in which a running gear is arranged on two rails arranged above each other in one plane, for carrying a carrying device. Each running gear comprises a drivable wheel, while the drives of the two wheels are mutually coupled through a coupling shaft. Via one motor, therefore, during use, both the upper and the lower driving wheel are controlled, with the drives, accordingly, being synchronized. This means that in particular in inclined portions of the rails, the position of the carrying device is determined by both the shape of the rails and the toothing provided thereon, and by the drive. This gives rise to a statically overdetermined construction which requires a particularly accurate manufacture and setting of the different parts of the displacement apparatus. This displacement apparatus too, therefore, is costly in manufacture and maintenance, and moreover susceptible to failure. In particular, this is also because upon asymmetrical loading of the carrying device, at least to the extent that a moment relative to the running gears arises, an unequal loading of the two driving wheels is obtained, so that an increased wear will arise and moreover the disadvantages mentioned are enhanced still further. Moreover, there is the risk that a driving wheel moves relative to the other driving wheel, giving rise to chronic skew.

Further, EP 0,152,136 discloses a displacement apparatus of the type described in the opening paragraph hereof, in which the two rails are mutually connected by connecting parts and are of hollow design. Through the rails and the connecting parts extends an endless bead chain. On each rail a running gear is provided, mutually connected by a carrying device. The upper rail is open at the underside, such that the upper running gear, by way of a driving cam, can engage between the beads of the chain. Adjacent the lower end of the upper rail, a driving wheel is arranged with which the bead chain can be moved, thereby driving the carrying device through the driving cam. Each running gear comprises two sets of wheels engaging the same rail at spaced apart points, the sets of wheels running on the upper and the lower rails being mutually coupled through a four-bar mechanism, such that positional changes occur synchronously. This known displacement apparatus is complex in construction and control and is susceptible to wear, in particular the bead chain and the driving cam, while the displacement apparatus is moreover statically overdetermined, owing to the four coupled sets of wheels.

The known displacement apparatuses are suitable for use both with horizontal displacements and with displacements proceeding along an inclined path.

BRIEF SUMMARY OF THE INVENTION

A displacement apparatus according to the invention is provided which includes a first rail, and a second rail extending substantially parallel thereto, while on the first rail a first driving gear with a first motor is provided and on the second rail a second driving gear with a second motor is provided, the first and the second rail comprising at least one inclined part, and control means being provided for the two motors, which control means are arranged for controlling the first and the second motor in a force-controlled manner at least on a portion of the at least one inclined part of the first and the second rail.

The use of two motors, one on each rail, which can be controlled in a position-controlled manner or force-controlled manner, as desired, provides the advantage that the carrying device, both with horizontal and with inclined rails, can be held in a desired position at all times, without the construction being statically overdetermined. At all times, on each portion of the rails, a suitable control can be chosen. Additionally, the advantage is achieved that any positional errors of the running wheels on the running rails can be simply compensated. Further, such a displacement apparatus has the advantage that the same assembly of a carrying device and driving gears can be used for both horizontal rails and vertical rails, and for a combination thereof, without entailing the disadvantages mentioned.

In further elaboration, a displacement apparatus according to the invention is provided having at least one substantially horizontally extending part of the first and second rail, the control means being arranged for controlling the first and second motor in a position-controlled manner at least on a portion of the at least one substantially horizontal part of the rails.

The use of position-controlled motors on rails extending horizontally, at least inclining to a very minor extent only, provides the advantage that a carrying device can be simply held in a desired position by means of the driving gears, regardless of the loading of the carrying device, while the rails and driving gears can be manufactured with relatively large tolerances. Force-controlled drive of the motors on inclined parts of the rails then provides the advantage that the construction is not statically overdetermined, and on the inclined parts is automatically held in the desired position.

In the case of force-controlled drive, each motor will be controlled depending on the forces applied to the driving gear, which forces are directly dependent on the loading of the carrying device. Here, the running speed of each of the motors, and hence of each of the running wheels on the inclined rails, can be adjusted, such that at all times the desired position of the carrying device is maintained. The stability of the carrying device on the inclined portions is substantially obtained in that the running wheels can then easily transmit forces in a direction perpendicular to the longitudinal direction of the respective rails, and by gravity.

In a further elaboration, a displacement apparatus according to the invention is provided which includes registration means provided for registering the angle of inclination of the first and/or second rail and/or the first and/or second driving gear, which registration means are connected with the control means, the control means being arranged for switching, at least on the basis of data from the registration means, between force-controlled control and position-controlled control of the motors.

The registration means for determining the angle of inclination of the rails adjacent the driving gears provide the advantage that in a simple manner the moment can be determined at which a switch is to be made from force-controlled drive to position-controlled drive or vice versa. The angles of inclination at which a switch is made are preferably chosen such that in each case the carrying device is still just stable.

In a preferred embodiment, a displacement apparatus according to the invention is provided which includes control means arranged for controlling the motors dependently of each other in a position-controlled manner and independently of each other in a force-controlled manner on the parts of the rails appropriate therefor.

By controlling the motors dependently upon each other when their drive is position-controlled and independently of each other when their drive is force-controlled, the advantage is achieved that the desired stability of the carrying device on the horizontal, at any rate only slightly inclined, rails can be obtained and maintained still better, without additional measures, while on the inclined part of the rails the stability is maintained, while the driving gears can simply follow the inclination and any inaccuracies of the rails. Moreover, the advantage thereby achieved is that in the inclined portion of the rails the two motors can independently of each other be controlled and checked in speed, such that the independent drives can form a so-called "fail-safe" system. Such a system is necessary to prevent the carrying device, in case of failure, from unintentionally sliding downwards along the rails in an uncontrolled manner. The use of the mutually independently driven force-controlled motors provides the advantage that even when either of the two motors malfunctions, the carrying device can still be held in an achieved position or can be displaced therefrom in an uncontrolled manner. As a result, the safety of the displacement apparatus is considerably increased, without necessitating further means to that effect, such as a safety brake or the like.

The invention further relates to a method for controlling a displacement apparatus comprising supporting means carried on two rails with a driving gear on each rail, each driving gear comprising a motor, and control means being provided for controlling the motors, wherein at least one reference angle is set in the control means, the motors being controlled by the control means in a position-controlled manner on a portion of the rails that includes an angle with the horizontal smaller than the reference angle, and the motors being controlled by the control means in a force-controlled manner on a portion of the rails that includes an angle greater than the reference angle.

In a method according to the present invention, in the control means at least one reference angle is set, the motors being controlled in a position-controlled manner when the angle of the rails is less than the reference angle, and the motors being controlled in a force-controlled manner when the angle of the rails is greater than the reference is angle. What is thus accomplished is that the displacement apparatus, at least a carrying device thereof, is always held in a desired position relative to the rails, while relatively large tolerances in the construction are allowable.

In further elaboration, the invention is a method wherein at least during the force-controlled drive of the motors the speed of movement of the displacement apparatus is monitored under a pre-set limit value, the arrangement being such that upon failure of one of the motors the displacement apparatus is brought to a halt.

By checking the speed of movement of the displacement apparatus, at least the rotary speed of the two motors, it can be simply established whether the carrying device has a desired movement pattern. If the speed of movement exceeds a pre-set value, it can be assumed that the carrying device is moving along the rails in an uncontrolled manner. Thereupon the motors can be slowed down, such that the carrying device is slowed down and optionally stopped. Moreover, the motors can be made of self-locking design, such that upon failure of either of the two motors, the carrying device automatically comes to a halt.

In a method or apparatus according to the present invention, the motors can be mutually coupled, in particular in the case of position-controlled drive, while the coupling can be accomplished mechanically, though preferably electronically. Motor, is herein understood to mean at least a drive unit for actively driving a running wheel in a driving gear, which may or may not be directly and individually energized.

Alternative embodiments of an apparatus and method according to the invention are given in the further subclaims.

BRIEF DESCRIPTION OF THE SEVERAL VIEWS OF THE DRAWINGS

To clarify the invention, a method and apparatus according to the invention will be further elucidated by way of example with reference to the drawings, In the drawings.

DETAILED DESCRIPTION OF THE INVENTION

Figure 1:
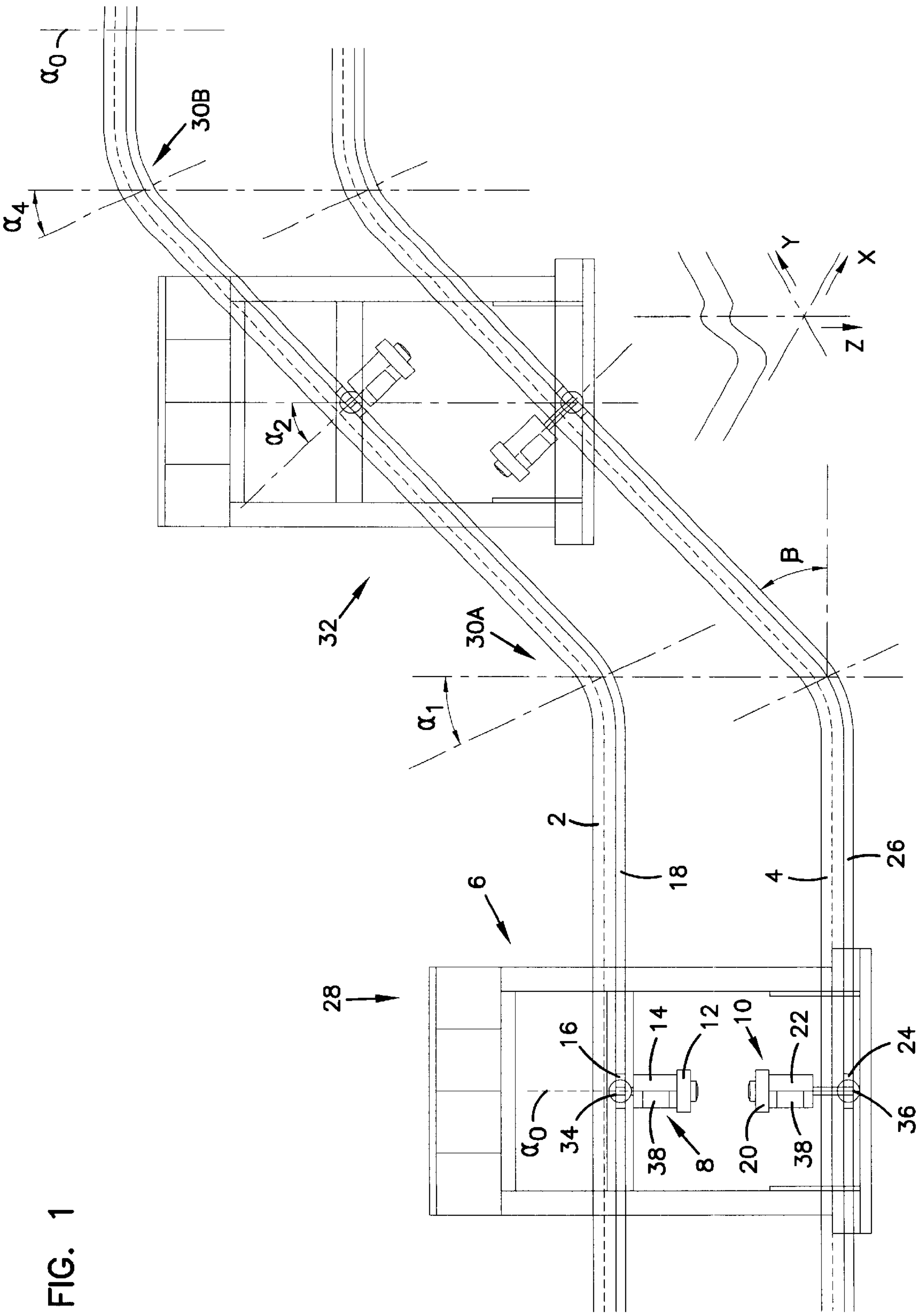
FIG. 1 schematically shows in front view a displacement apparatus according to the invention, designed as a platform lift.

In this description, corresponding parts have corresponding reference numerals. In this description, a displacement apparatus is described as a platform lift but other embodiments are also possible, such as a chairlift or other apparatuses for displacing persons and/or goods in horizontal and/or vertical direction.

FIG. 1 shows in front view a portion of a stairlift according to the invention, comprising a first rail 2 and a second rail 4, extending parallel thereto and contained in the same vertical plane, on which two rails 2, 4 a carrying device 6 is carried by a first driving gear 8 engaging the first rail 2 and a second driving gear 10 engaging the second rail 4. The first driving gear 8 comprises a first motor 12, which is connected via a reduction gearbox 14 with a driving wheel 16. The driving wheel 16 is provided with external teeth which can cooperate with a tooth track 18 on the first rail 2. Similarly, the second driving gear 10 comprises a second motor 20, which is connected via a reduction gearbox 22 with a second driving wheel 24, which engages through its outer teeth a second tooth track 26 on the second rail 4.

A stairlift according to FIG. 1 comprises a horizontal portion 28 of the rails, which merges via a bend 30 with an inclined portion 32 of the rails. The two rails 2, 4 are so designed that the vertical distance between the two tooth tracks 18, 26 is substantially the same throughout the path of the rails. The driving gears 8, 10 are placed straight above each other, are made of relatively compact design and have, at least viewed in the longitudinal direction of the rail, a relatively narrow overall width. As a consequence, a carrying device 6 can also traverse bends having a relatively small bending radius, located, for instance, in a plane perpendicular to the plane of the drawing of FIG. 1, as schematically represented in perspective at the bottom, right, of FIG. 1.

Figure 2:
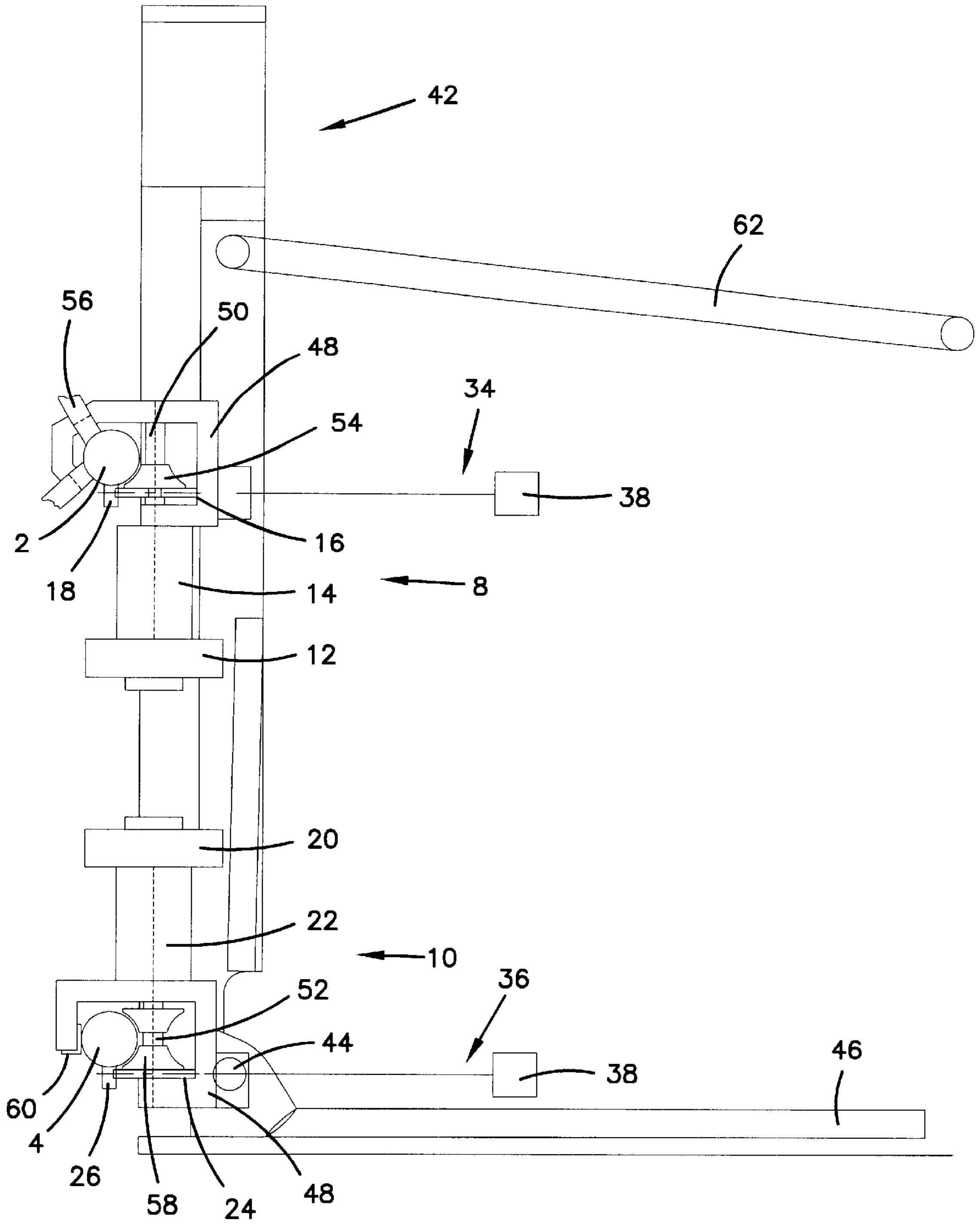
FIG. 2 shows in side elevation a platform with two driving gears for a lift according to FIG. 1, carried on two rails.

The driving gears 8, 10 in the embodiment shown in FIGS. 1 and 2 are bearing-mounted for pivotal movement relative to the carrying device 6 about a pivotal axis 34, 36, respectively, which may or may not be virtual. The pivotal axes extend perpendicularly to the plane of the drawing, adjacent the axes of the driving wheels 16, 24 in the exemplary embodiment shown. What is thus accomplished is that when the driving wheels 16, 24 traverse the bend 30, pivotal movement of the driving gears 8, 10 will be obtained, equal to temporal angular change of the rail 2, 4, so that the running wheels, in particular the driving wheels 16, 24, continue to run straight on the tooth tracks 18, 26. FIG. 1 shows a carrying device 6 both on the horizontal portion 28 and on the inclined portion 32, clearly visualizing the change in position of the two driving gears 8, 10.

At least one of the driving gears 8, 10 comprises angle measuring means 38, with which the position of the respective driving gear 8, 10 relative to, for instance, the vertical can be determined. In the position of the carrying device 6 shown in FIG. 1 on the left-hand side, on the horizontal part 28 of the rails 2, 4, the angle $\alpha_0$ in question is about 0°. In the position of the carrying device 6 shown in FIG. 1 on the right-hand side, on the inclined portion 32 of the rails 2, 4, this angle $\alpha_2$ is, for instance, 45°0. The angle $\alpha_2$ obviously depends on the angle of inclination β of the part in question of the rails 2, 4. In FIG. 1, at the first bend 30*a*, an angle α1 is schematically drawn in. When the driving gears 8, 10 assume a position which includes this angle $\alpha_1$, the carrying device is still just stable. Further, in the second bend 30*b* in FIG. 1, an angle $\alpha_4$ is drawn in. When the driving gears 8, 10 assume an angular position which includes the angle $\alpha_4$, the carrying device 6 is likewise still just stable. If the carrying device assumes an angle greater than $\alpha_1$ or $\alpha_4$, the carrying device 6 is in principle unstable, since the driving gears 8, 10 and the rails 2, 4 in this path are insufficiently capable of taking up eccentric forces exerted on the carrying device 6, so that tilting of the carrying device in the plane of the drawing would be possible if no further measures are taken. In the apparatus according to the present invention, therefore, in the path where the drive units 8, 10 include an angle between $a_0$ and $a_1$, and between $a_0$ and $a_4$, respectively, each driving gear 8, 10 is driven in a position-controlled manner. As a result, in the manner described, the carrying device can be held in the desired vertical position. In fact, the relative position of each driving gear 8, 10 relative to the respective rail 2, 4 can then be accurately determined and set, while any occurring eccentric forces can be taken up by cooperation of the tooth track 18, 26 and the driving wheel 16, 24. In such a position, no static overdetermination arises.

With the carrying device on the inclined portion 32, where the driving gears 8, 10 include an angle greater than $a_1$ and $a_4$, respectively, it will be possible, upon eccentric loading of the carrying device, for a relatively large portion of the occurring forces to be readily taken up by the running wheels 40 of the carrying device 6 (FIG. 2). In fact, a relatively large component of the occurring resulting force will be at right angles to the longitudinal direction of the respective portion of the rail 2, 4. In the path in question, the driving gears 8, 10 are driven in a force-controlled manner, so that static overdetermination is prevented while yet the desired position of the carrying device 6 is automatically obtained and maintained. The force control moreover provides the advantage that when one of the driving gears 8, 10 is subject to heavier loading in that the forces arising thereon are greater than, for instance, on the other driving gear, this will automatically be compensated such that for each driving gear the most suitable driving speed is obtained and maintained. Should either of the driving gears 8, 10 on the inclined part 32 of the rails 2, 4 malfunction or fail, this will be established as a result of the occurring forces and/or the rotary speed of preferably the driving gear that does function, and the carrying device will come to a halt and/or be secured in a position in a controlled manner, or be moved up or down along the rail 2, 4 into a horizontal portion 28. On the inclined portion 32 of the rails 2, 4 the force-controlled driving gears 8, 10 therefore function as a "fail-safe" system. This makes further safety provisions such as brakes, safety grippers and the like basically redundant.

A carrying device 6, as shown in side elevation in FIG. 2, comprises a backplate 42 on which adjacent the underside a folding platform 46 is mounted by means of a pivotal axis 44. To the backplate 42, the upper driving gear 8 is pivotally connected via the axis 34 and the lower driving gear 10 via the axis 36. To that end, each driving gear comprises a carrying bracket 48 to which the reduction gearbox 14, 22 with the associated motors 12 and 20, respectively, are connected and in which the driven shafts 50, 52 with the driving wheels 16, 24 are bearing-mounted. Each suspension bracket 48 extends around the respective rail 2, 4. At the upper driving gear 8, on the driven shaft 50, next to the driving wheel 16, a slightly frustoconically shaped first guide wheel 54 is arranged, while the suspension bracket 48 carries two second guide wheels 56, which run against the rail 2, in each case staggered about 60° relative to the first guide wheel. In other words, the rail 2 is confined between the first guide wheel 54 and the two second guide wheels 56. On the driven shaft 52 of the lower driving gear 10, two substantially frustoconical third guide wheels 58 are arranged, with the truncated ends facing each other, which third guide wheels lie fittingly against the outer side of the lower rail 4. The respective suspension bracket 48 is provided, on the side remote from the third guide wheels 58, with a fourth guide wheel or guide support 60, such that the lower rail 4 is confined between the two third guide wheels 58 and the fourth guide wheel 60. Obviously, other configurations for the guidance of the two driving gears on the rails in question can be chosen. The guide wheels 52, 60 each have circumferential surfaces adapted to the outer circumference of the respective rails 2, 4. Such modes of confining rails by guide wheels or the like are well known.

As is represented schematically in FIG. 2, to each pivotal axis 34, 36 an angle sensor 38 is coupled for determining the angle taken by the respective driving gear 6, 10. On the backplate 42, further, a pivoting arm is arranged in the form of a safety bracket 62.

In FIG. 1 it is schematically shown how the driving gears 8, 10 are connected to a central control unit 71. In the embodiment shown, the driving gears and connections are made of mirror-symmetrical design, but it is also possible to provide measuring and control means to be described hereinafter for only a single driving gear 8 or 10. For each driving gear 8, 10, in the embodiment shown, an angle measuring device 38 is provided, as well as speed measuring and control means 70, and position measuring and control means 72, while moreover means 74 can be provided for registering the loading of the motors 12, 20. The different measuring and control means 38, 70, 72, 74 are connected with the central control unit 71, to which moreover operating means 76 are connected. These operating means 76 can, for instance, be arranged on the carrying device 6 and/or adjacent an end or an intermediate position of the rails 2, 4. Further connected to the central control unit is a computer 78 or a like data inputting device, with which limit values can be set and with which a part of the control can be programmed, checked and controlled. For that purpose, incidentally, means may also be provided in the central control unit 71, for instance a microprocessor and a keyboard. These and comparable variants will be immediately clear to one skilled in the art.

The limit values $\alpha_1$ and $\alpha_4$, as well as any limit values for the load, rotary speed and position, in particular positional differences, of the driving gears, can be inputted in the central control unit, while moreover maximum allowable deviations can be set for the driving gears 8, 10 relative to each other and/or the limit values set. Subsequently, if the angles $\alpha_1$ and $\alpha_4$ are exceeded, the central unit 71 will switch from position-controlled control to force-controlled control of the motors, or vice versa, bared on the conditions mentioned earlier. By way of the registration means for registering the speed, the loading of the motors and/or the position of the driving gears 8, 10, the desired data can be supplied to the central control unit, on the basis of which through control of the driving gears the desired position of the carrying device 6 relative to the rails 2, 4 can be controlled, independently of or depending on the loading thereof.

Figure 4:
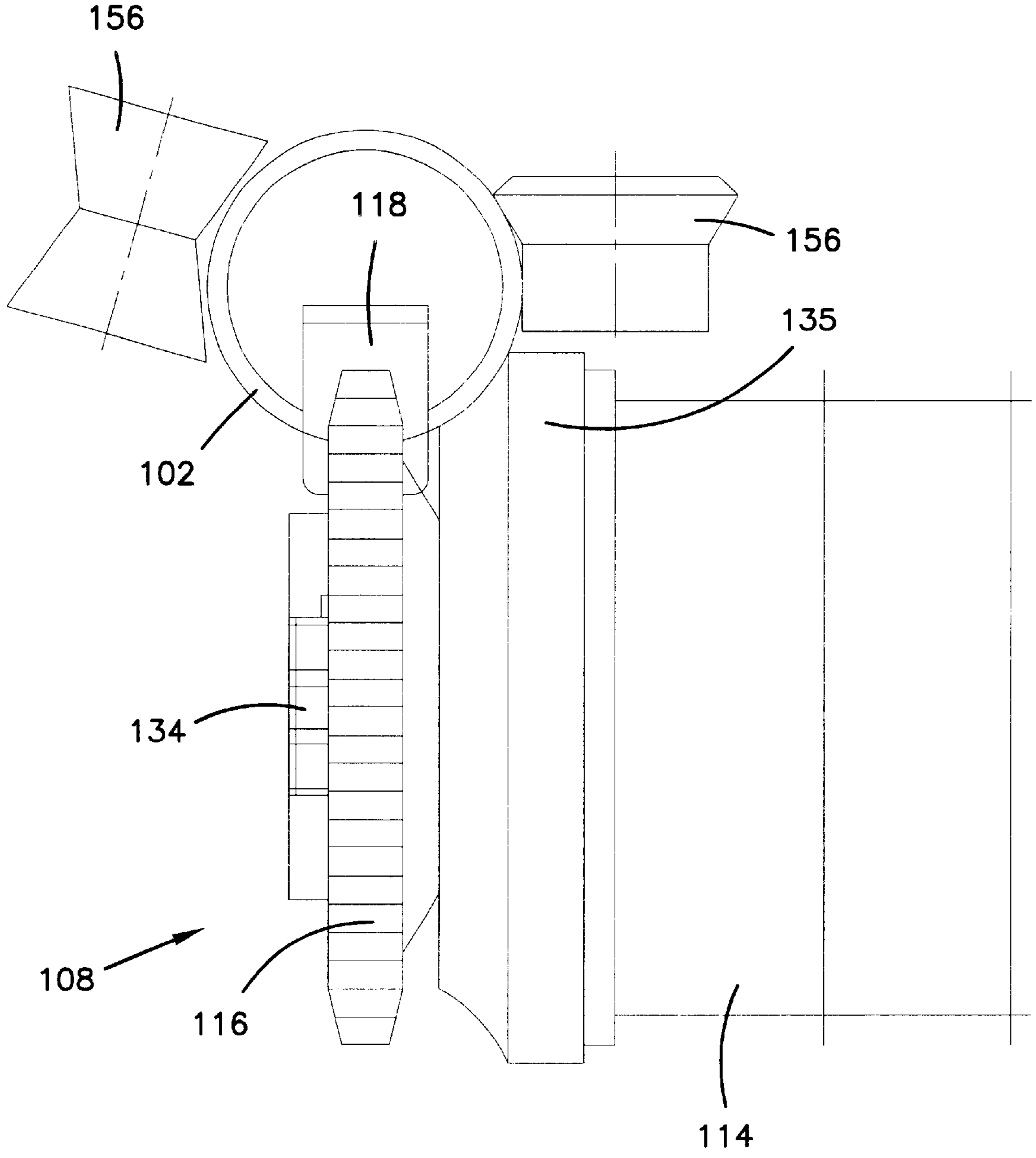
FIG. 4 shows in side elevation a portion of an upper driving gear.

In FIG. 4, an alternative embodiment of a driving gear 108 for a carrying device according to the invention is shown, as upper driving gear. It comprises a driving wheel 116, rotatable around a driving shaft 134, which is driven by a first motor 112 with a first reduction gearbox 114. The driving wheel 116 extends in a vertical plane, under the upper rail 102, in which a suitable toothing 116 is provided. Owing to the vertical position of the driving wheel 116 in question, the first motor 112 can be fixedly connected with the carrying device 106.

Figure 5:
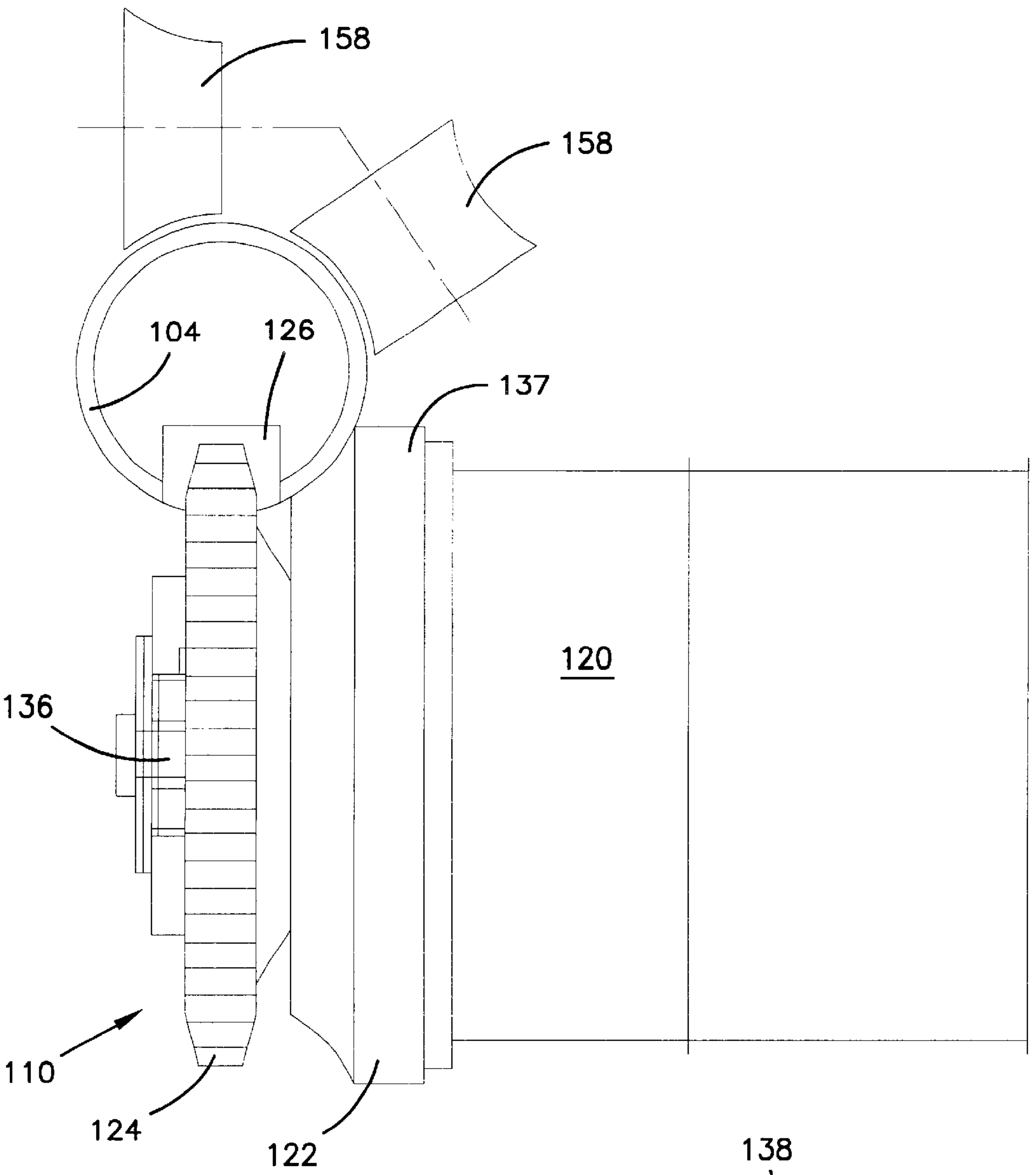
FIG. 5 schematically shows a portion of a lower driving gear.

FIG. 5 shows in a similar view a lower driving gear 110, provided with a second driving wheel 124, connected via a second driving shaft 136 and a second reduction gearbox 122 with a second motor 120 which is fixedly connected with the carrying device 6. The lower driving wheel 124 engages in a tooth track 126 provided in the lower rail 104, and is located in a vertical plane, preferably in the same vertical plane as the upper driving wheel 116. As appears from FIGS. 4 and 5, on the shaft 134, 136, a supporting wheel 13S, 137 is arranged, supported against the outer side of the rail 102, 104, for obtaining a suitable positioning of the driving wheel 116, 124 relative to the tooth track 118, 126. To that end, on each rail 102, 104, further guide wheels 156, 158, comparable to the guide wheels shown in FIG. 2, are provided. Many variations of this, however, are possible, which will be immediately clear to one skilled in the art.

Figure 3:
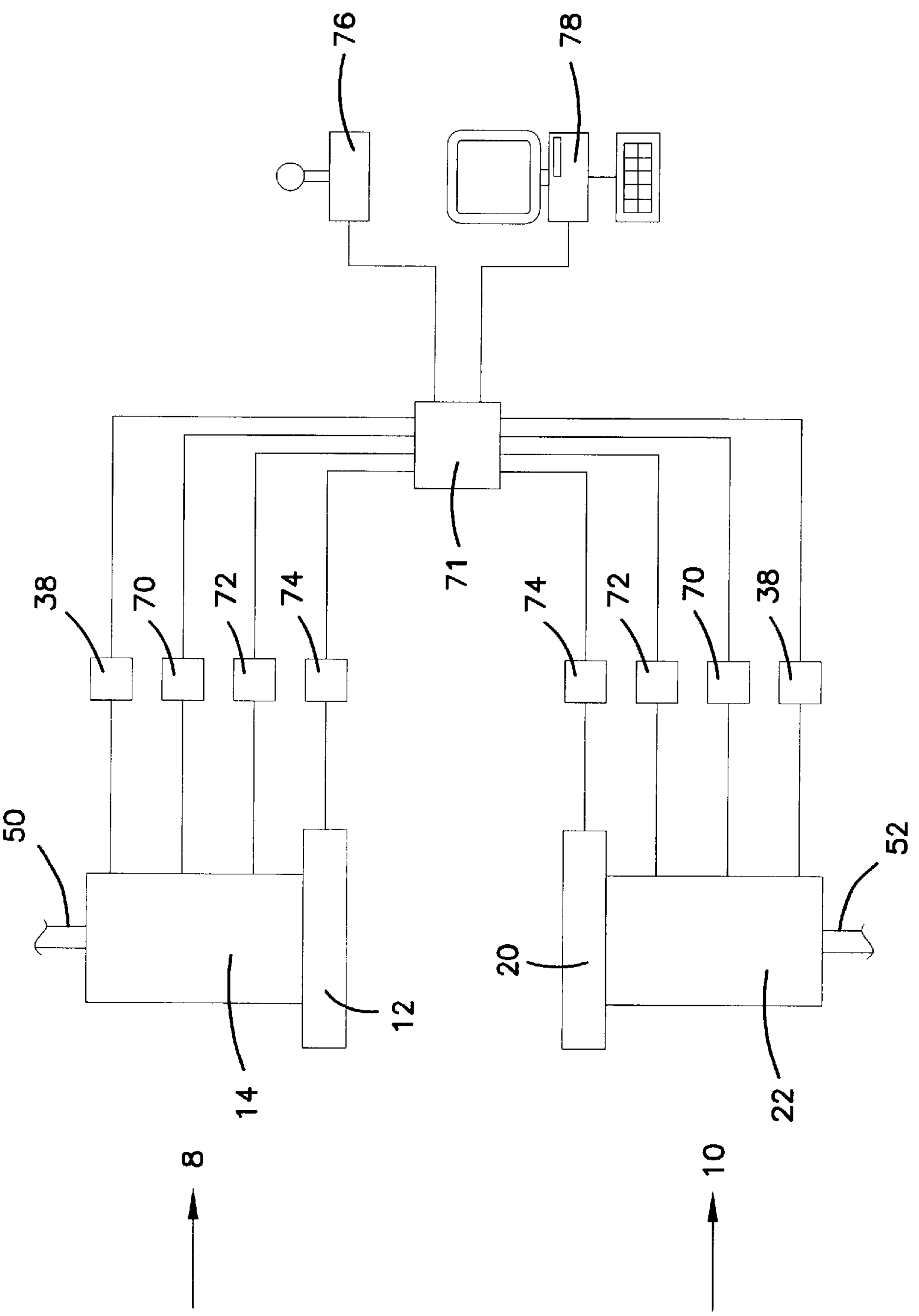
FIG. 3 schematically shows a control diagram for a displacement apparatus according to the invention.
Figure 6:
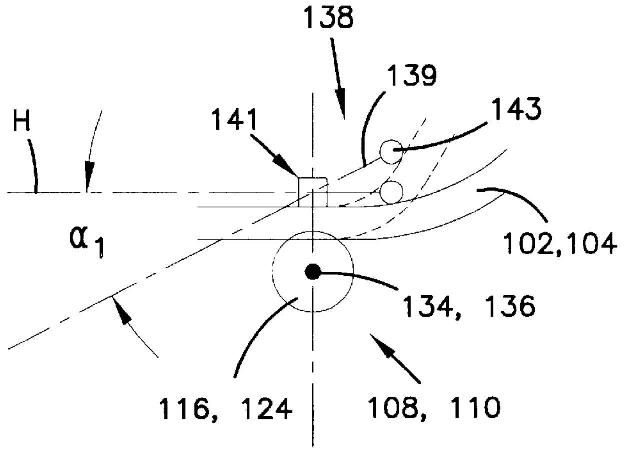
FIG. 6 schematically shows a driving gear according to FIG. 4 or 5 provided with angle registering means.

FIG. 6 schematically shows, in front view, a driving gear 108, 110 according to FIGS. 4 and 5, incorporating angle measuring means 138. The angle measuring means 138 comprise, for instance, an arm 139, adapted to pivot in a pivotal point 141 fixedly arranged relative to the rotation axis 134, 136 of the driving wheel 116, 124. At a distance from the pivotal point 141, for instance a guide wheel 143 is arranged which is supported against the top of the rail 102, 104. The pivoting arm 139 is biased in downward direction, so that the wheel 143 remains in contact with the respective rail 102, 104. In the pivotal point 141 an angle sensor is included for measuring the angle $\alpha_1$, enclosed by the pivoting arm 139 and the horizontal H. In this way, in a simple manner, the angle can be determined at which a switch is to be made from position-controlled control to force-controlled control or vice versa, as described hereinbefore with reference to FIGS. 1–3. It will be clear, incidentally, that other kinds of angle registering means 138 can be used, as long as the shape of the rail can be determined by them with sufficient accuracy for switching from position-controlled control to force-controlled control and vice versa.

The invention is not limited in any way to the embodiments presented in the description and the drawings. Many variations thereof are possible.

Thus, means can be provided for providing a signal when set limit values are exceeded, for instance when either of the motors is subject to excessive loading. The driving gears, in particular in position-controlled condition, can be controlled in mutual dependency, while the driving gears 8, 10 can be mutually coupled electronically via the central control unit 71 or mechanically, via, for instance, a coupling shaft between the two driving gears, which can be switched on and off. During force control, the motors are preferably controlled independently of each other. The limit angles at which a switch is made from force-controlled control to position-controlled control and vice versa can be equal, but it is also possible to set each limit angle differently or to make it dependent upon the loading of the platform. The fact is that at greater or more eccentric loading of the platform, a lesser stability will be of greater influence than in the case of a lesser load and/or a more central load. The rails 2, 4 and the associated guide means for guiding the carrying device along the rails can be designed in a different manner, for instance as rails of a different cross section, while moreover the tooth tracks can be arranged at a different position on the rails 2, 4. Further, as stated, the carrying device can be designed in a different manner, for instance as a chair or basket or as a suspension means, Obviously, the rails 2, 4 can be adapted in all kinds of ways and have all kinds of two- or three-dimensional bent shapes, adapted to the specific use. These and many comparable embodiments are understood to fall within the framework of the invention outlined by the appended claims.

What is claimed is:

1. A displacement apparatus comprising:

a first rail, a second rail extending substantially parallel to the first rail, a first driving gear movably engaged with the first rail, a first motor engaged with the first driving gear so as to drive the first driving gear along the first rail, the first motor being movable with the first driving gear along the first rail, a second driving gear movably engaged with the second rail, a second motor engaged with the second driving gear so as to drive the second driving gear along the second rail, the second motor being movable with the second driving gear along the second rail, control means adapted to control the first and second motors, and a carrying device engaged with the first and second motors and first and second driving gears so as to be movable along the first and second rails therewith, wherein the first and the second rails each comprise at least one inclined part, and the control means are adapted for controlling the first and the second motors in a force-controlled manner on at least a portion of the at least one inclined parts of the first and the second rails.

2. A displacement apparatus according to claim 1, wherein the first and second rails each comprise at least one substantially horizontally extending part, and wherein the control means are adapted for controlling the first and second motors in a position-controlled manner on at least a portion of the at least one substantially horizontal parts of the first and second rails.

3. A displacement apparatus according to claim 1, wherein the control means are adapted for controlling the motors in a position-controlled manner adjacent at least one of an initial part and an end part of the at least one inclined part of the rails.

4. A displacement apparatus according to claim 3, further comprising registration means for registering an angle of inclination at least one of the first driving gear on the first rail and the second driving gear on the second rail, wherein the control means in communication with the control means and are adapted for switching between force-controlled control and position-controlled control of the motors based at least on data regarding the angle of inclination from the registration means.

5. A displacement apparatus according to claim 4, wherein the control means are adjustable with regard to an angle of inclination of the at least one inclined parts of the first and second rails at which the control means switch between force-controlled control and position-controlled control of the motors.

6. A displacement apparatus according to claim 1, wherein the first and the second motors are coupled so as to operate identically.

7. A displacement apparatus according to claim 1, wherein the control means are adapted for controlling the first and second motors dependently when the first and second motors are controlled in a position-controlled manner, and are adapted for controlling the first and second motors independently of each other when the first and second motors are controlled in a force-controlled manner.

8. A displacement apparatus according to claim 1, wherein the first and second rails comprise teeth, and the first and second driving are engaged with the teeth.

9. A method for controlling a displacement apparatus comprising first and second rails, a first driving gear movably engaged with the first rail, a first motor engaged with the first driving gear so as to drive the first driving gear along the first rail, a second driving gear movably engaged with the second rail, a second driving gear movably engaged with the second rail so as to drive the second driving gear along the second rail, control means adapted for controlling the first and second motors, and a carrying device engaged with the first and second motors and first and second driving gears so as to be movable along the first and second rails therewith, the method comprising the steps of setting at least one reference angle in the control means;

controlling the motors with the control means in a position-controlled manner when an angle of the rails relative to a horizontal direction is smaller than the reference angle; and controlling the motors with the control means in a force-controlled manner when the angle of the rails relative to the horizontal direction is greater than the reference angle.

10. A method according to claim 9, further comprising the steps of:

controlling the motors dependently with the control means in a position-controlled manner when the angle of the rails relative to the horizontal is smaller than the reference angle; and controlling the motors independently with the control means in a force-controlled manner when the angle of the rails relative to the horizontal is greater than the reference angle.

11. A method according to claim 9, further comprising the step of monitoring a speed of movement of the displacement apparatus and bringing the displacement apparatus to a halt if the speed of movement exceeds a pre-set limit value.

12. A method according to claim 9, comprising the step of setting at least two reference angles, the at least two reference angles comprising a first reference angle for switching from position-controlled control of the first and second motors to force-controlled control of the first and second motors, and a second reference angle for switching from force-controlled control of the first and second motors to position-controlled control of the first and second motors.

13. A method according to claim 9, further comprising the steps of registering a force on each of the first and second motors at least during force-controlled control of the first and second motors, and generating a warning signal when a registered force on at least one of the first and second motors exceeds a pre-set limit value.

14. A displacement apparatus according to claim 6, wherein the first and second motors are coupled electronically.

15. A displacement apparatus comprising:

a first rail, a second rail extending substantially parallel to the first rail, a first driving gear movably engaged with the first rail, a first motor engaged with the first driving gear so as to drive the first driving gear along the first rail, the first motor being movable with the first driving gear along the first rail, a second driving gear movably engaged with the second rail, a second motor engaged with the second driving gear so as to drive the second driving gear along the second rail, the second motor being movable with the second driving gear along the second rail, control means adapted to control the first and second motors, and a carrying device engaged with the first and second motors and first and second driving gears so as to be movable along the first and second rails therewith, wherein the control means are adapted for controlling the first and the second motors in a force-controlled manner and in a position-controlled manner and for switching therebetween.

16. A displacement apparatus according to claim 15, wherein the control means are adapted to switch between the force-controlled manner and the position-controlled manner of controlling the first and second motors based on a relative position of the first gear with respect to the first rail and a relative position of the second gear with respect to the second rail.

17. A displacement apparatus according to claim 16, wherein the first and the second rails each comprise at least one inclined part, and the control means are adapted for controlling the first and the second motors in a force-controlled manner on at least a portion of the at least one inclined parts of the first and the second rails.

* * * * *